Nov. 7, 1939.    C. DOERING    2,178,781
CHILLING MACHINE
Filed Oct. 12, 1936    3 Sheets-Sheet 1

Inventor
Charles Doering
BY
Larry C. Leavitt
Attorney.

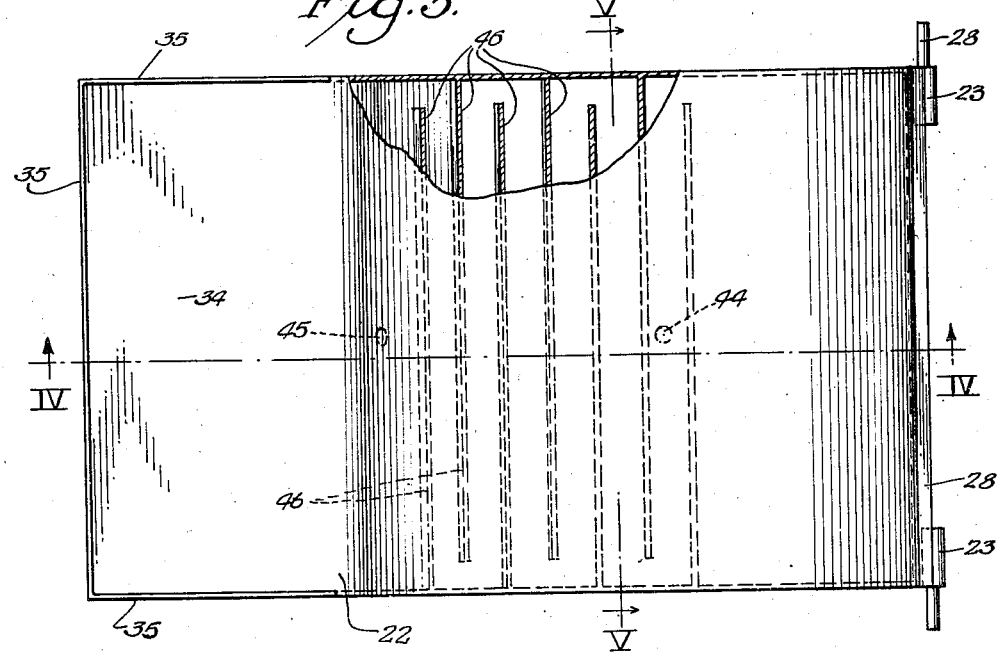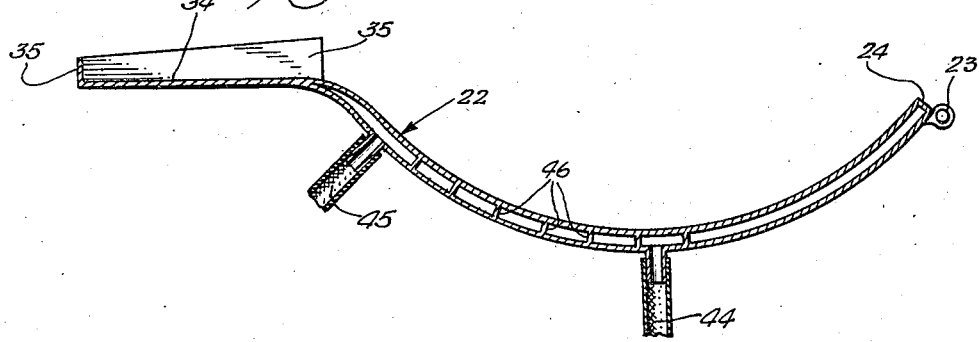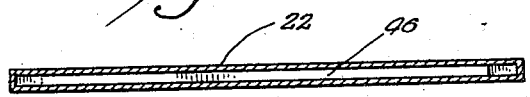

Nov. 7, 1939.  C. DOERING  2,178,781
CHILLING MACHINE
Filed Oct. 12, 1936    3 Sheets-Sheet 3
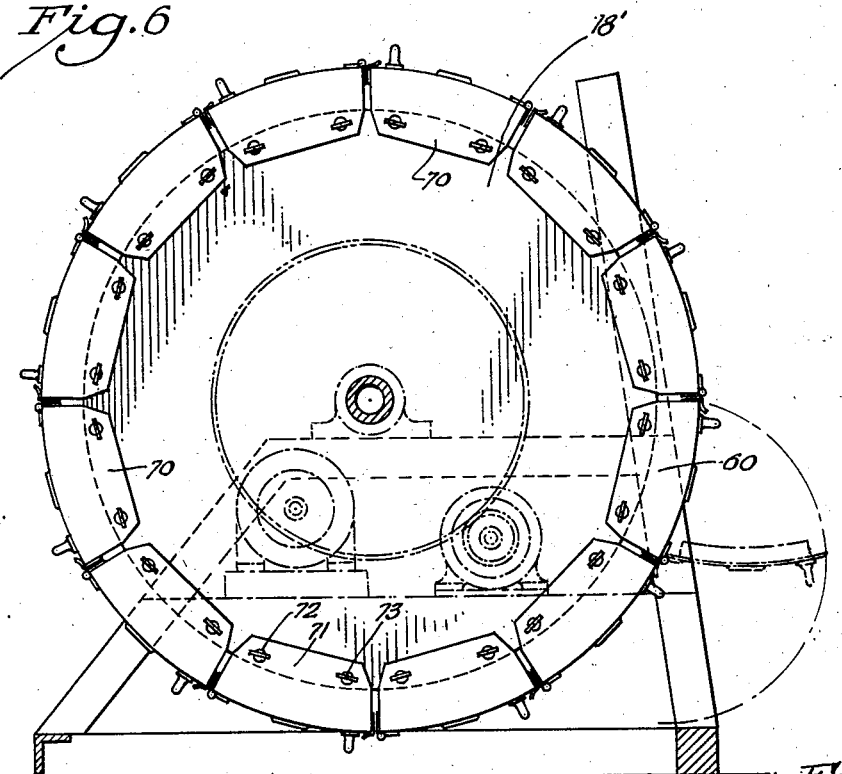
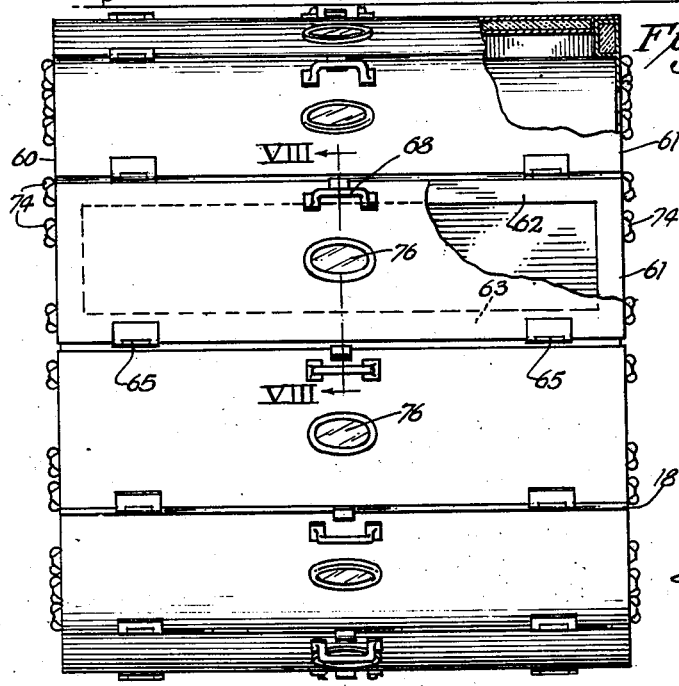
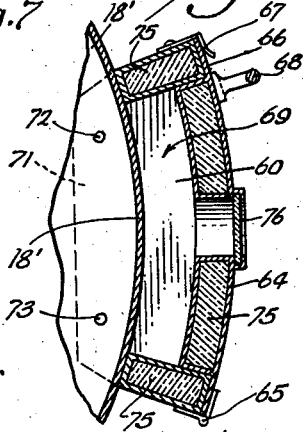
Inventor
Charles Doering
BY
Harry C. Suntz
Attorney.

Patented Nov. 7, 1939

2,178,781

UNITED STATES PATENT OFFICE 2,178,781

CHILLING MACHINE

Charles Doering, Chicago, Ill., assignor of one-half to Henry Doering, Chicago, Ill.

Application October 12, 1936, Serial No. 105,262

10 Claims. (Cl. 62—114)

This invention relates to chilling machines and more particularly to edible substance chilling machines, although it may be employed with equal advantage for other purposes.

It contemplates more especially the provision of improved feeding means for directing edible substances along a predetermined path to a refrigerated surface for instantaneously solidifying or hardening normally liquid or plastic substances to impart keeping qualities and effect the conversion thereof into a more useful form or consistency.

It has heretofore been the practice of subjecting normally unstable substances to refrigeration prior to packaging or otherwise preparing such for eventual consumption. This involves the placement of freshly produced edible substances into a hardening room which requires considerable time for solidifying the substances and maintaining such against deterioration. Not only is a great deal of time entailed in hardening such substances for preservation and sale, but these become unevenly solidified in that the body proximate to the surface becomes much colder than the interior to the extent that normally liquid and plastic edible products such as butter, eggs, and the like become mottled, non-uniform in texture, and lack homogeneity to the extent that the interior is not always maintained fresh nor free from deterioration.

In my copending application serially numbered 100,505 and filed September 12, 1936, a conveyor belt is utilized to feed the substances along a predetermined path, but in the present improved embodiment a transfer pan serves that purpose more effectively and with increased simplicity. Numerous moving parts and power instrumentalities are dispensed with, thereby acquiring more dependability in operation and reducing the cost of machine construction, operation and maintenance. Greater uniformity and better control are also insured with a transfer pan that is temperature regulated to expedite feeding of any particular substances and thus provides flexibility in its adaption to many different types of substances.

One object of the present invention is to provide improved feeding means for directing edible substances along a predetermined path to effect instantaneous and uniform hardening throughout the body thereof.

Another object is to provide improved means for effecting the traverse of successive increments of edible products along a predetermined path so as to effect their solidification substantially uniformly, homogeneously and instantaneously.

Still another object is to provide improved means for transferring substances to a refrigerated surface for substantially instantaneous hardening and chilling.

A further object is to provide improved instrumentalities for transferring edible substance to and from a refrigerated surface to effect the instantaneous chilling and hardening thereof for preservation and conversion into a substantially solid state.

A still further object is the provision of an improved transfer pan for a chilling machine to effect the delivery of normally liquid or plastic edible substances for instantaneous refrigeration and conversion to a solid state.

Still a further object is to provide means for uniformly treating successive increments of plastic substances without entailing any appreciable time or labor and effecting their accumulation into a uniformly blended and homogeneously solidified mass.

An additional object is to provide improved attachments for association with a refrigerated surface so that edible substances may be refrigerated for preservation.

Still an additional object is to provide an improved refrigerated surface for devices of the character mentioned.

Other objects and advantages will appear from the following description of an illustrative embodiment of the present invention.

In the drawings:

Figure 3 is a detail plan view of a transfer pan embodying features of the present invention, parts thereof being broken away to clarify the showing.

Figure 4 is a sectional view taken substantially along line IV—IV of Figure 3.

Figure 5 is a sectional view taken substantially along line V—V of Figure 3.

Figure 6 is a side view in elevation of a modified embodiment of the present invention, there being shown special attachments secured to the cylinder to refrigerate solid edible substances or products.

Figure 7 is a plan view of the refrigerated drum with the special attachments for confining solid edible substances.

Figure 8 is a sectional view taken along line VIII—VIII of Figure 7.

Figure 1:
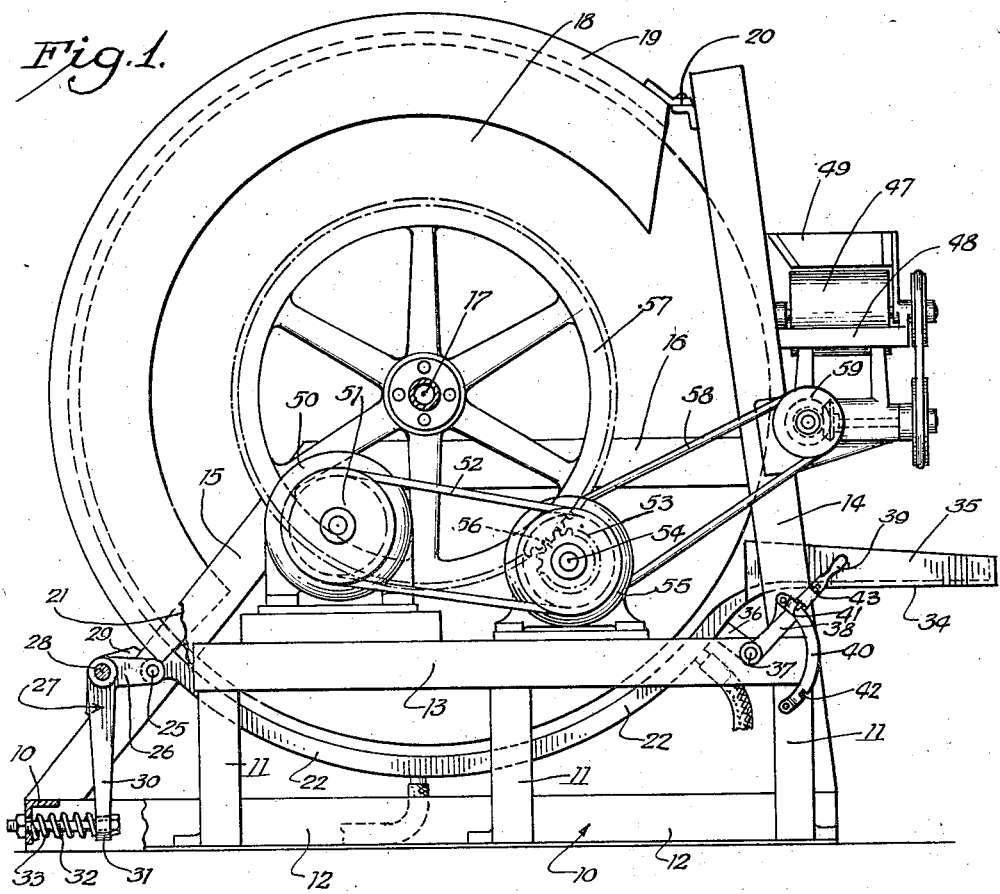
Figure 1 is a side view in elevation of a device embodying features of the present invention, parts thereof being shown in section to clarify the showing.

The structure selected for illustration comprises a frame base 10 from which extend vertical beams 11 that are in space parallelism for rigid spaced support by horizontal cross members 12 that support a platform 13 serving as a part of the frame structure to constitute an instrumentality support as will appear more fully hereinafter. Upwardly converging standards 14 and 15 support elevated beam members 16 which are provided with split bearings for journalled support of a shaft 17. The shaft 17 carries a comparatively large cylindrical member such as a closed-end drum 18 that is fixed thereto for rotation therewith between the horizontal beam members 16.

The drum 18 defines a large circumferential surface that is refrigerated in any suitable or customary manner. In this instance, the drum 18 is refrigerated in any suitable manner as commercial practice may dictate or as more fully disclosed and described in my copending application Serial Number 100,505 and filed September 12, 1936. It is to be noted that the refrigerated peripheral surface of the external drum 18 extends throughout the surface extent thereof to provide the greatest refrigeration capacity. The sides of the external drum 18 are preferably provided with sheets of insulation material so as to direct, concentrate and transmit cold from the refrigerant passing through the drum 18 and against the interior peripheral surface thereof so that the substances to be chilled will contact the exterior thereof to instantaneously impart a chilling temperature thereto and effect the solidification or refrigeration thereof in successive increments as the drum 18 rotates relative to a charging mechanism for feeding edible substances thereto in a continuity of operations. The drum 18 is preferably provided with an external enclosure or casing 19 that conforms in shape therewith and is supported thereover by attachment as at 20 and 21 to the upwardly converging standards 14 and 15.

Figure 2:
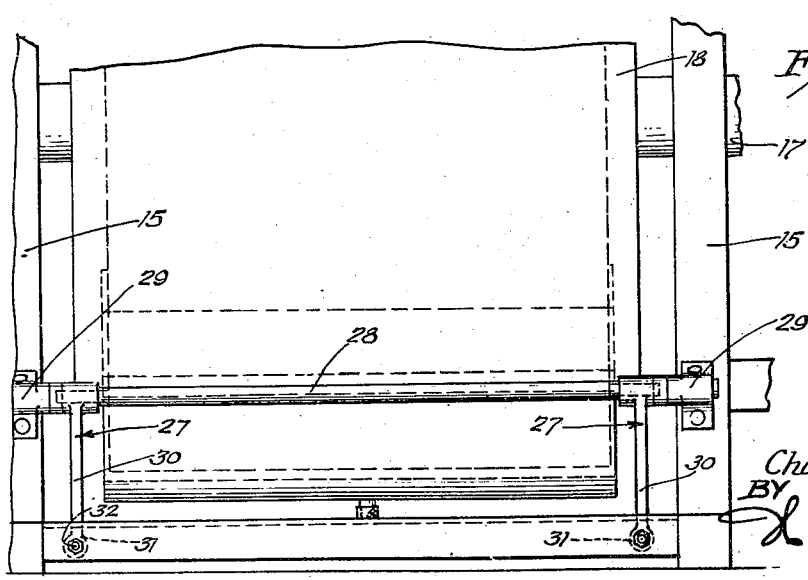
Figure 2 is a fragmentary rear view in elevation of the device shown in Figure 1.

The substances are supplied to the external peripheral surface of the refrigerated drum 18 in a uniform layer of any desired thickness by means of a transfer device or pan 22 which is disposed a short distance below the surface of the drum 18 and conforms in curvature thereto so as to define the path of travel for the edible substances for gradual adhesion to the refrigerated surface of the drum 18 that rotates in a clockwise direction (viewed from Figure 1) relative thereto. To this end, the transfer device 22 has confronting lugs 23 formed on the extreme rearward edge 24 thereof for pivotal connection to pins 25 carried by the short arms 26 of bell crank levers 27. The bell crank levers 27 are pivotally supported on a pivot shaft 28 extending between and journalled in brackets 29 attached to the inclining frame standards 15 (Figures 1 and 2). The bell crank levers 27 have their long arms 30 terminating in apertured bosses 31 which receive carriage bolts 32 freely extending therethrough for mounting in the frame base 10. Coil springs 33 envelop the carriage bolts 32 to normally urge the bell crank levers 27 in a counterclockwise direction (viewed from Figure 1) and in consequence thereof yieldingly sustain the transfer device or pan along its rearward edge 24 at a normally fixed distance from the drum 18.

The transfer pan 22 extends arcuately forwardly to substantially conform in curvature to the lower region of the drum 18 between the upwardly converging standards 14 and 15 of the frame 10. As shown, the pan 22 is chambered for its entire arcuate extent to receive a tempering fluid therethrough as will appear more fully hereinafter, and terminates forwardly beyond the frame standards 14 in a substantially horizontally extending solid flat portion 34 having an upstanding peripheral flange 35 along the sides and forward edge thereof to receive and confine the edible substances thereon.

In order to maintain the transfer member 22 in its operative and inoperative positions, lever arms 36 extend to the under side thereof (Figure 1) and are pivotally connected as at 37 to provide angular extending levers 38 having manipulating handles 39 at their extremities for effecting the angular displacement of the pan positioning lever 38 relative to arcuate guide plates 40. The guide plates 40 are notched as at 41 and 42 to cooperate with a spring impelled detent 43 carried by the levers 38 as a complement of the notches 41 and 42 to maintain the levers in any one of these two extreme positions so that the transfer member or pan 22 may be supported in its operative position (shown in Figure 1) or its inoperative position away from the drum 18 to afford cleansing thereof and access thereto. The edible substances are placed upon the flat solid forward extension 34 of the transfer pan 22 for displacement to the arcuate portion thereof which extends rearwardly for a distance sufficient to insure that a uniform layer of the substance will adhere to the periphery of the drum by virtue of its refrigeration sufficient to give instantaneous chilling adhesion of the substance thereto.

This transfer member 22 has a warm water intake pipe 44 that provides a tempering fluid supply to the chambered interior thereof. A discharge pipe 45 communicates with the interior thereof to discharge the warm water that circulates therethrough, thereby maintaining the transfer plate 22 at a slightly higher temperature than the surrounding atmosphere, but a temperature that is considerably above the refrigerated drum 18 to permit the substance to pass thereover without adhesion or friction so far as the transfer plate 22 is concerned. A plurality of baffle plates 46 are disposed within the chambered interior of the transfer member or plate 22 to provide a circuitous path for the tempering fluid entering the intake port 44 and leaving the port 45. The number and directional arrangement of the baffle plates 46 may be varied to meet the dictates of commercial practice. The transfer pan 22 merely serves to apply the substance as it is lodged upon the flat projecting portion 34 thereof for manual displacement in the direction of the drum 18 for adhesion thereto and displacement thereover without any appreciable frictional reaction. The transfer plate 22 is yieldingly supported in a manner fully described supra in order to permit foreign substances to pass thereover without injury thereto or the drum 18. The position of the transfer plate 22 with respect to the periphery of the drum 18 predetermines the thickness of the substance layer adhering thereto, this being adjustable responsive to the handle levers 38 that are displaceable along the arcuate guide plates 40.

Suitable scraping or substance removing instrumentalities are provided in engagement with the periphery of the drum 18 to remove the chilled substances therefrom in a manner more fully described in my copending application Serial Number 100,505 and filed September 12, 1936. The removed substances are discharged into a conveyor unit 47 mounted by means of brackets 48 to the forward inclined standards 14. The conveyor unit 47 has upstanding sides 49 for the width of the drum 18 to receive the chilled substances from the scraper mechanism (not shown) mounted thereabove in engagement with the drum 18. It is to be noted that the discharge conveyor 47 may convey the chilled substances to any desired treating machine for packing, conversion or wrapping as conditions may require and the particular substances or production operations may afford.

In order to rotate the drum 18, an electric motor 50 is mounted on the platform 13 and has the armature shaft thereof provided with a pulley 51 to drive a belt 52 having frictional peripheral engagement with a pulley 53 carried by a shaft 54 of a speed reducer 55. The speed reducer 55 is also mounted on the platform 13 and has a comparatively smaller pinion 56 in meshing engagement with a large spur gear 57 attached for rotation to the drum supporting shaft 17 to impart rotation to the drum 18. Another pulley is fixed to the speed reducer pinion 53 to drive a belt 58 in peripheral engagement with a pulley 59 operatively connected to a train of gears to linearly displace the conveyor belt 47.

Some of the edible substances that are effectively chilled with the instrumentalities described supra are butter, shelled eggs, lard, cottonseed oil, oleomargarine, innumerable emulsions, liquids and plastic edibles that may advantageously be converted and preserved through refrigeration. With the use of attachments, even a greater variety of edible substances may be instantaneously chilled and preserved. In the modified embodiment shown in Figures 6 to 8 inclusive, the refrigerated drum 18' has a plurality of circumferentially spaced attachments serving as compartments for the confinement of solid fresh foods such as fish, butter, and the like that may require instantaneous freezing before being confined in a hardening room or in a refrigerated truck for transportation purposes without impairment thereto.

To this end, the attachments comprise compartments having confronting end walls 60—61 complemental to side walls 62 and 63 which define a compartment open at the bottom thereof to confront the periphery of the refrigerated drum 18' (Figure 8). A removable closure 64 is hinged as at 65 to the side walls 63 while the opposite closure edge 66 overlaps the side walls 62 (Figure 8) to cooperate with a resilient clip 67 to maintain the closure 64 in hermetically sealed closed position. A handle 68 is fixed to each of the closures 64 adjacent or proximate to the resilient clip 67 so as to enable the opening and closing thereof for access to the chambered interior 69 that communicates with the periphery of the drum 18'.

In order to enable the attachment and detachment of the chambered defining enclosure, the end walls 60 and 61 are spaced to receive the drum 18' therebetween and have overlapping plate extensions 70 and 71 in attachment with the end walls of the drum 18' so as to afford attachment by means of any suitable fasteners such as threaded studs 72 and 73 projecting through each plate 60 and 61. The threaded studs 72 and 73 have winged heads 74 to enable their convenient manipulation to effect threaded engagement or disengagement with correspondingly threaded bores provided in the end walls of the drum 18'. It is to be noted that the side walls 62 and 63 are radially disposed so that a plurality of compartments 69 may be circumferentially spaced in closed adjacent relation around the periphery of the drum 18' for rotation therewith.

The end walls 60—61 and the side walls 62—63 as well as the closure 64 are preferably chambered to receive insulation material 75 therein that reduces thermal conduction, transmission and radiation therethrough, and confines the cold to the interior chamber 69 for direct subjection of the edible solid substances thereto. A transparent peep-hole 76 is preferably provided in the closure 64 to enable visual inspection of the contents of the compartment 69 to determine the extent of freezing and the effect of the treatment thereon. As the drum 18' rotates, the edible solid substances confined in the compartment 69 will be tumbled so that each individual unit thereof will be directly subjected to the coldest temperature within the compartment 69 and afford direct contact with the periphery of the drum 18' during the movement so as to more uniformly and effectively refrigerate and chill the solid substances confined therein. When the substances have been properly refrigerated and are chilled completely therethrough, the drum 18' is brought to a stop and the closure 64 opened so as to transfer the refrigerated substances to a hardening room or a refrigerated truck for transportation to the market.

Various changes may be made in the embodiment of the invention herein specifically described without departing from or sacrificing any of the advantages of the invention or any features thereof, and nothing herein shall be construed as limitations upon the invention, its concept or structural embodiment except as defined in the appended claims.

I claim:

1. In a chilling device of the character described, the combination with inclined stationary surface means for enabling the gravity displacement of edible substances along a predetermined path, of chilled means for effecting the traverse of said substances beyond said path and for converting the edible substances to a chilled solid state, and means for circulating a tempering fluid through said stationary surface means to facilitate the transfer of the substances to said chilling means.

2. In a chilling device of the character described, the combination with inclined stationary substantially flat surface means for directing edible substances along a predetermined path, of cylindrical chilled means in confronting relation with said stationary means for effecting the traverse of said substances beyond said path and for converting edible substances to a chilled solid state, and means for circulating a tempering fluid through said stationary surface means to facilitate the passage of the substances to said chilling means.

3. In a chilling device of the character described, the combination with a rotatable cylindrical drum, of means for refrigerating said drum to convert edible substances to a chilled solid state, and a relatively large stationary plate member having an arcuate open upper surface portion conforming to the curvature of said drum for effectively transferring edible substances from said stationary means to said rotatable drum.

4. In a chilling device of the character described, the combination with a rotatable cylindrical drum, of means for refrigerating said drum to convert edible substances to a chilled solid state, stationary surface means having an arcuate upper substance supporting surface portion conforming to the curvature of said drum, and means for circulating a tempering fluid through said stationary means for effectively transferring edible substances from said stationary means to said rotatable drum.

5. In a chilling device of the character described, the combination with a rotatable cylindrical drum, of means for refrigerating said drum to convert edible substances to a chilled solid state, a stationary plate member having an arcuate upper substance supporting surface portion conforming to the curvature of said drum, means for circulating a tempering fluid through said stationary means for effectively transferring edible substances from said stationary means to said rotatable drum, and means for adjusting said stationary transfer means relative to said drum chilling means.

6. In a chilling device of the character described, the combination with chilling means for refrigerating edible substances, of a rigid stationary plate member having an open upper substance supporting surface for directing edible substances to said chilling means, means for resiliently mounting said stationary plate member relative to said chilling means, and adjustable means for supporting said stationary means in operative and inoperative positions relative to said chilling means.

7. In a chilling device of the character described, the combination with chilling means for refrigerating edible substances, of a rigid stationary plate member having a relatively large surface to support surfaces in confronting relation with said chilling means for directing and transferring edible substances to said chilling means, and means for resiliently mounting said stationary means relative to said chilling means, adjustable means for supporting said stationary means in operative and inoperative positions relative to said chilling means, and means for circulating a tempering fluid through said stationary means.

8. In a chilling device of the character described, the combination with a refrigerated cylindrical drum, of a substance transfer pan mounted in uniform spaced relation to said drum for directing substances thereon, said transfer pan being chambered to provide circulation for a tempering fluid therethrough, the chambered portion of said transfer pan being arcuate to conform with the curvature of said drum, and a solid platform extension on said transfer pan to sustain the substances prior to being directed to said chilling drum.

9. In a chilling device of the character described, the combination with a refrigerated cylindrical drum, of a substance transfer pan mounted in uniform spaced relation to said drum for directing substances thereon, said transfer pan being chambered to provide circulation for a tempering fluid therethrough, the chambered portion of said transfer pan being arcuate to conform with the curvature of said drum, and a solid platform extension on said transfer pan to sustain the substances prior to being directed to said chilling drum, the chambered portion of said pan having interior baffles for defining a circuitous path for the tempering fluid.

10. In a chilling device of the character described, the combination with a refrigerated cylindrical drum, of a substance transfer pan pivotally mounted in uniform spaced relation to said drum for directing substances thereon, said transfer pan being chambered to provide circulation for a tempering fluid therethrough, the chambered portion of said transfer pan being arcuate to conform with the curvature of said drum, a solid platform extension on said transfer pan to sustain the substances prior to being directed to said chilling drum, the chambered portion of said pan having interior baffles for defining a circuitous path for the tempering fluid, and means for yieldingly sustaining said transfer pan in operative spaced relation to said drum.

CHARLES DOERING.